INVENTOR
WINFRED J. WIESE
ATTORNEY

INVENTOR
WINFRED J. WIESE
BY
ATTORNEY

INVENTOR
WINFRED J. WIESE
BY
ATTORNEY

United States Patent Office 3,498,620
Patented Mar. 3, 1970

3,498,620
MECHANICAL SEAL LUBRICATION MEANS
Winfred J. Wiese, Whittier, Calif., assignor to Borg-Warner Corporation, Chicago, Ill., a corporation of Delaware
Filed Jan. 22, 1968, Ser. No. 699,579
Int. Cl. F16j 15/34, 15/40
U.S. Cl. 277—12
8 Claims

ABSTRACT OF THE DISCLOSURE

A lubricating and cooling system for a mechanical shaft seal for a pump including means and method to vent objectionable air from the system; also including an auxiliary injection circuit operative to lubricate the seal means before starting the pump and automatically operative for a predetermined time to continue lubricating the seal means until the pump has reached normal operating speed, whereby its regular lubricating and cooling means becomes effective; and safety means preventing operation of the pump when its regular seal lubricating and cooling circuit is inoperable.

CROSS-REFERENCES TO RELATED APPLICATIONS

Reference may be had to the application of Herbert E. Tracy, Ser. No. 469,700, filed in the United States Patent Office on July 6, 1965, for "Mechanical Seal Construction" which application discloses a system for lubricating the seals of a pump having a mechanical seal of the type used herein, together with an auxiliary injection system for injecting a lubricating fluid into a zone between the sealing faces. Also, reference is made to the copending application of Harold G. Wilk, filed concurrently herewith, for "Mechanical Seal Start-Up Lubricating Arrangement." Both of the above applications and this application are assigned to the same assignee and thus have a common ownership.

BACKGROUND OF THE INVENTION

The invention disclosed herein has to do with the lubrication and cooling of a mechanical seal used for sealing a rotating shaft through a pressure vessel, wherein one seal element rotates with the shaft and a second seal element is held stationary, the two seal elements having contiguous faces one of which is urged against the other, wherein one rotates relative to the other. Such arrangement is conducive of extreme friction and heating being developed between the relative rotating faces and, unless properly lubricated, the seal means will be seriously damaged or destroyed. Primarily this invention is directed to assuring the proper lubrication, particularly under start-up conditions for the device in which the seals are installed, to assure that the lubrication of the seal faces is adequate during the starting operation. It is well known that excessive wear takes place at the seal faces even during the few rotations necessary to start the device operating and to bring it up to normal operating speed.

The principle of operation of seals of this type and also means for cooling and lubricating such seals during normal operation subsequent to start-up, is disclosed in various patents and is well known in the art. See, for example, Tracy U.S. Patent No. 2,824,759, for "Liquid Cooled Seal," issued Feb. 25, 1958; Tracy U.S. Patent No. 2,928,685, for "Packing Means for High Pressure Mechanical Seals," issued Mar. 15, 1960; and Tracy U.S. Patent No. 3,015,506, for "Multi-Step Mechanical Seal," dated Jan. 2, 1962.

SUMMARY OF THE INVENTION

It is the purpose hereof to disclose an improved means and method of lubricating the seals for a pressure vessel having a rotating shaft therethrough such, for example, as the mechanical seals for the shaft of a centrifugal boiler feed pump for pumping very hot liquids under high pressures. It has been found that such mechanical seal means, which usually includes two relatively rotating seals with complementary faces, are not adequately lubricated and conditioned for operation by the regular pump lubricating system when the pump is newly installed and is first started up, or when the pump has been shut down for a period of time such as for repair or for standby operation. Since it is a difficult and expensive procedure to replace the seal faces, the excessive wear and damage caused by friction when the faces are not lubricated is a serious problem. It is an object therefore, to provide an improved auxiliary lubrication circuit which will provide lubricant directly to the seal faces at least during the start-up operation for the pump, and preferably also prior thereto, to eliminate any operation of the seals without proper lubricant during the start-up operation and until the pump reaches normal operating speed.

In connection with the conditioning of the system, it is an object of the invention to provide an improved means for eliminating trapped air. Heretofore, this has been difficult and the pump installers and operators have had to disconnect the fluid lines to allow any air therein to escape during the filling operation. This is a time-consuming job and may not be entirely effective, especially if performed by a workman not completely familiar with the problem to be solved. Applicant has provided a simple means and method accomplishing this purpose which will result in eliminating objectionable air or gas from not only the pump, but also the cooling system and the auxiliary injection system, and which method is simple, positive and rapid to perform.

It is a further object in this connection, to provide simple valve-operated vent means for eliminating such entrapped air from the pump and cooling system, and a separate valve-operated means for eliminating entrapped air from the auxiliary injection system. It may be noted that a minute portion of air, because of the pressure involved, may not be seriously objectionable, but it is desirable that all air be out of the system.

It is a further object to provide a means whereby the pump may not be operated if the cooling and lubricating system is not open to normal fluid circulation to cool and lubricate the seals.

It is an object of the present invention to disclose a preferred method of venting and conditioning the cooling system and auxiliary injection system and the means for accomplishing such purpose.

Other objects will become evident as the invention is described in the following detailed description along with the accompanying drawings.

DESCRIPTION OF THE PREFERRED EMBODIMENTS

Figure 1:
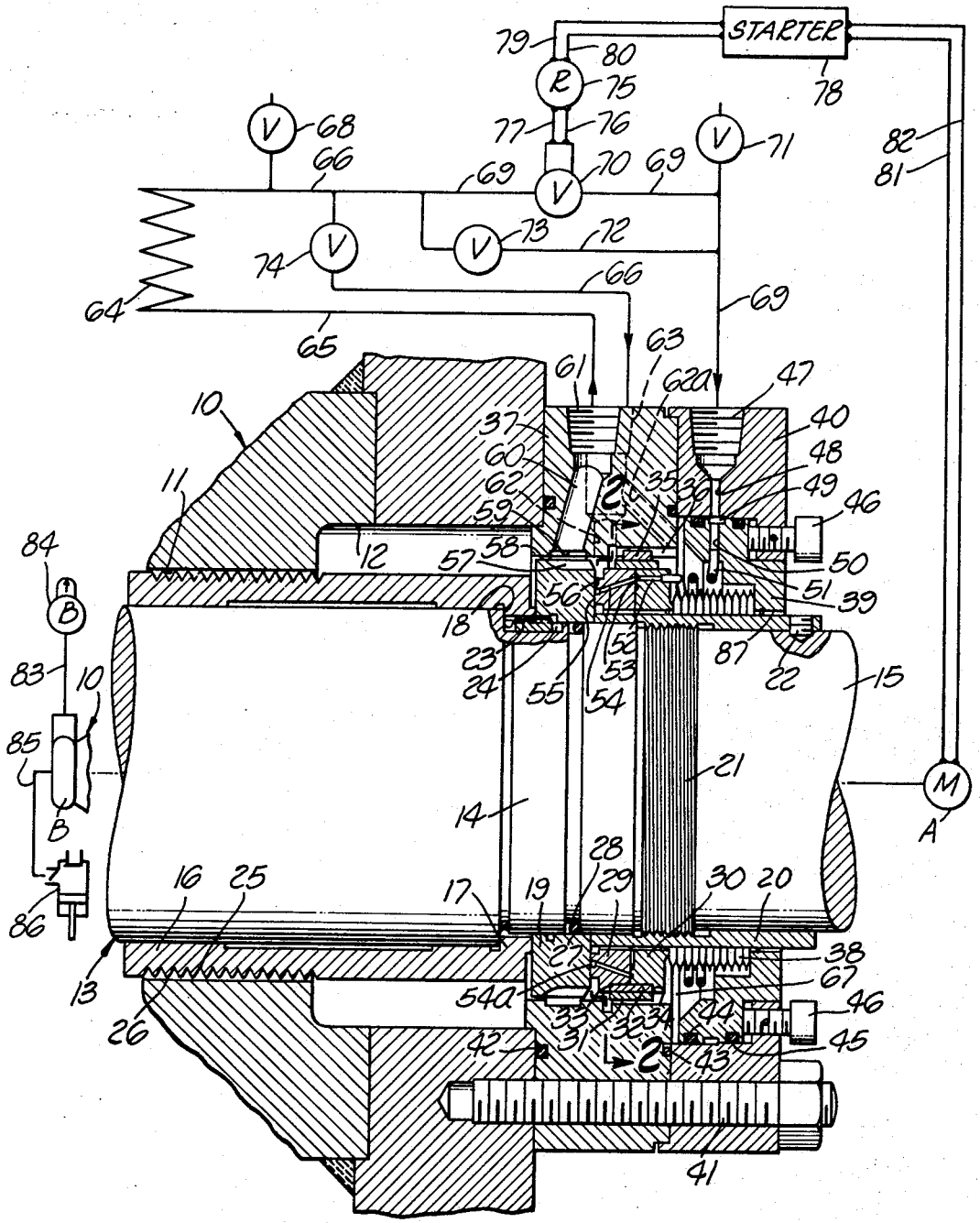
FIG. 1 is a fragmentary longitudinal sectional view showing, schematically, associated equipment of the pres-mechanical seal to which the invention is directed, and showing, schematically, associated equipment of the present invention.

Referring more in detail to the drawings, the reference numeral 10 designates generally a housing such as a centrifugal pump housing having a shaft opening extending therethrough, the opening including a restricted bore 11, and an enlarged bore forming a stuffing box chamber 12. A shaft 13 extends through the opening in the housing. A centrifugal pump impeller, designated schematically at B, may be mounted on the left-hand end of the shaft, as seen in FIG. 1, and a driver or prime mover, such as the electric motor A, is drivingly connected to the right-hand end of the shaft.

The shaft has a reduced portion 14 and a portion 15 still further reduced in diameter. A sleeve 16 having an inturned flange 17 is mounted on the shaft 13, with the flange 17 in abutment with a shoulder 18 on the shaft. A rotary sealing ring 19 is mounted on the reduced shaft portion 14, with the inner face of the sealing ring in abutment with the flange 17 on the shaft sleeve 16. An internally threaded sleeve or nut 20 is threaded to the shaft by threads 21 and is screwed into engagement with the outer face of the sealing ring 19 to retain the latter in place by clamping it between the flange 17 and the re-retaining sleeve or nut 20. The retaining nut 20 is further secured to the shaft by means of a set screw 22. The shaft sleeve 16 and the rotary sealing ring 19 are prevented from rotating relative to the shaft by a key 23 received in a keyway 24 in the reduced portion 14 of the shaft 13 and in the complementary opposed keyways in the flange 17 of the shaft sleeve 16 and in the rotary sealing ring 19, as will be clear from the drawing. With this arrangement, the shaft 13, the sleeve 16, rotary sealing ring 19 and clamping nut 20 are locked together and rotate as a unit.

The shaft sleeve 16 is provided with a plurality of parallel circumferential grooves 25 forming the V-shaped ridges 26. The outer peripheries of these ridges 26 lie adjacent to the restricted bore 11 of the pump housing and form with the bore a labyrinth seal that restricts or limits outward flow of fluid from the pump outlet or interior of the housing 10, through the clearance between the shaft sleeve 16 and the restricted bore 11 and into the enlarged bore or stuffing box 12. Thus, fluid from the pump chamber has a restricted flow path into the stuffing box 12.

In a groove 28 in the reduced portion 14 of the shaft is an O-ring 27 for preventing flow of fluid outwardly along the shaft and between the rotary sealing ring 19 and the reduced portion 14 of the shaft.

The shaft 13 is journaled in suitable bearings (not shown), as is conventional.

A stationary or non-rotary sealing ring 29 is arranged in sealing relation to the rotary sealing ring 19. The rotary sealing ring 19 and the stationary sealing ring 29 have complementary or mating faces, preferably perpendicular to the shaft 13. The fixed or stationary sealing ring 29 is mounted upon a backing ring 30 by any convenient means, such as a mounting ring 31, that encircles both the stationary sealing ring 29 and the backing ring 30. The mounting ring 31 has one or more axially arranged keys 32 that are received in one or more slots 33 in the stationary sealing ring 29 and the aligned slot 34 in the backing ring 30. Preferably two keys and two sets of aligned slots are used in diametrically disposed relationship. Extending outwardly from the mounting ring 31 is one (or more) key (or keys) 35 received in a keyway (or keyways) 36 in a flange 37. With this construction, the fixed or stationary sealing ring 29 is securely mounted upon the backing ring 30 by the mounting ring 31. The key 32 prevents relative rotation between the stationary sealing ring and its backing ring and mounting ring. The key 35 prevents relative rotation of the stationary sealing ring assembly with respect to the flange 37.

It will be observed that the stationary sealing ring 29 and backing ring 30 have limited axial movement with respect to the shaft 13, whereby the sealing ring 29 may be urged against the rotary sealing ring 19 or may be allowed to move axially away from the sealing ring 19 to reduce or eliminate engagement of the two rings.

One end of a (preferably metallic) bellows 38 is welded or otherwise attached to the outer face of the backing ring 30. The other end of the bellows is attached, preferably by welding, to the bellows adapter 39. The bellows adapter is received within an auxiliary flange 40 which, in turn, is mounted upon the flange 37. Bolts, such as bolts 41, secure the flange 37 and the auxiliary flange 40 to the housing 10. Leakage between housing 10 and the flange 37 is prevented by an O-ring 42, and leakage between the flange 37 and the auxiliary flange 40 is prevented by another O-ring 43. O-rings 44 and 45 prevent the loss of fluid between the auxiliary flange 40 and the bellows adapter 39.

The bellows adapter 39 is axially slidable in the auxiliary flange 40. Adjusting screws 46, 46 are employed to set the bellows adapter 39 at a selected axial position with respect to the shaft 13 for attaining the desired compression of the bellows 38, whereby the non-rotary sealing ring 29 may be preloaded with the desired force to urge it against the rotary sealing ring 19.

It is noted that a seal cavity 67 is formed between the shaft portion 15 and the internal surfaces of the flanges 37 and 40, wherein the seals and associated mechanism are located, and fluid from the stuffing box created by the enlarged bore 12 will enter the seal cavity space surrounding (radially outward of) the rotatable ring 19, the stationary ring 29, backing ring 30 and the bellows 38, providing a supply of liquid from the pump to be used in lubricating and cooling the seal rings and associated mechanisms. Reference is made to Tracy U.S. Patent No. 2,824,759 for "Liquid Cooled Seal," issued Feb. 25, 1958; Tracy U.S. Patent No. 2,928,685, for "Packing Means for High Pressure Mechanical Seals," issued Mar. 15, 1960; and Tracy U.S. Patent No. 3,015,506, for "Multi-Step Mechanical Seal," dated Jan. 2, 1962, as showing generally similar arrangements and describing the principle of operation of mechanical seals of the general type here illustrated.

In the present arrangement, provision is made for directing cooling and lubricating fluid through a heat exchanger to the seal cavity for lubricating and cooling the opposed seal faces of the sealing rings 19 and 29. Also, additional provision is made for an auxiliary injecting system, in addition to the usual seal cooling and lubricating system, specifically for lubricating the seal faces of the sealing rings 19 and 29 before the pump's regular cooling system takes over, the auxiliary system being operable only prior to and during the start-up of the pump. In this connection, an improved arrangement is also provided for fiilling the system with fluid having means to assure that all or practically all entrapped air in the pump fluid system, heat exchanger and conduits, is eliminated prior to relative rotation of the seals.

Figure 2:
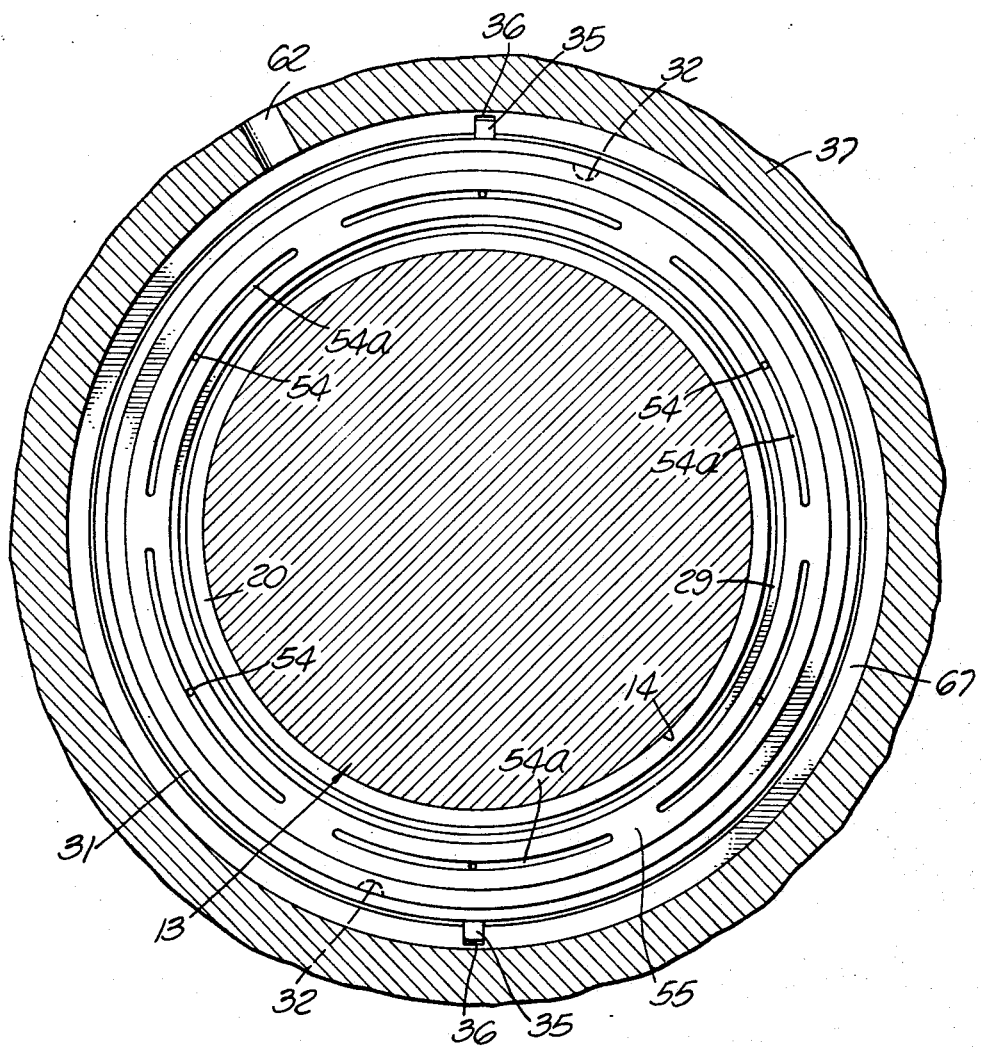
FIG. 2 is a fragmentary cross-sectional view taken on the line 2—2 of FIG. 1, looking in the direction of the arrows.

As will be seen in FIG. 1, a tapped hole 47 is provided in the periphery of the auxiliary flange 40. Lubricating fluid from an auxiliary injection system (hereafter described) is introduced into the tapped hole 47, and is conducted from this hole through a bore 48 in the auxiliary flange 40, to an annular slot 49 on the outer periphery of the bellows adapter 39. Another bore 50 leads radially inward through the bellows adapter 39 from the slot 49 and is connected to one end of a continuous length of flexible tubing 51. The tubing 51 leads (may be coiled about the bellows 38) into an auxiliary bore 52 that extends through the backing ring 30 and opens into an annular slot 53 formed on the inner end of the backing ring 30. A plurality of longitudinal bores 54 extend through the stationary sealing ring 29, and each of these bores communicates at its inner end with an arcuate groove 54a in the sealing face 55 of the stationary sealing ring 29. As will be most apparent from FIG. 2, six such bores 54 and arcuate grooves 54a are appropriate, although this number may be varied as desired. Thus, when lubricating fluid under pressure is injected into the tapped hole 47, it will flow through the bore 48, the groove 49, the bore 50, the flexible tubing 51, and into the bore 52 in the backing ring 30. Lubricating fluid then flows through the bore 52 into the annular groove 53 in the backing ring, and thence through the bores 54 into the arcuate grooves 54a and thus providing a flow path into the space between the sealing face 55 of the stationary sealing ring and the sealing face 56 of the rotary sealing ring 19, tending to move stationary seal ring 29 axially away from rotary seal ring 19, causing liquid to flow over the seal faces 55 and 56 and lubricate them. Thus it is seen that the injection of fluid under pressure through the auxiliary injection means into the tapped hole 47 delivers fluid under pressure onto the relative rotating faces 55 and 56 of the stationary and rotatable sealing ring, providing such faces with lubricating fluid.

The rotary sealing ring 19 is in effect also a pumping ring, and also is preferably constructed as a thermal barrier to limit the amount of fluid (usually hot) from the stuffing box that flows into the space around the sealing rings and associated mechanism. As shown here, the rotary sealing ring 19 is provided with a series of peripheral vanes 57, preferably formed with an open end on the side of the ring forming the face 56, and which vanes 57 do not extend entirely axially through the ring 19, whereby to form a periphery or shoulder 58, which acts to deter flow of hot liquid from stuffing box 12 and hence as a thermal barrier to the pump liquid. The periphery or shoulder 58 extends radially outwardly to a position closely adjacent the inner circumference of the flange 37.

The flange 37 is provided with an annular groove 59 on its inner periphery and aligned with the pumping vanes 57. A bore 60 extends generally radially outwardly from the annular groove 59 and communicates with a tapped hole 61. Thus, fluid pumped by the vanes of pumping ring 19 is carried by the annular groove 59 into the bore 60 and out through the tapped hole 61.

Preferably aligned generally with the face areas 56 and 55 of rings 19 and 29 respectively, is an inlet hole 62 opening at its bottom or radially inner end into the area above and adjacent to the mating or complementary seal faces 55 and 56, and at its outer end connecting to a tapped hole 63, whereby fluid entering the tapped hole 63 will be conducted through the inlet hole 62 and discharged on the outer surfaces of the seals in close proximity to their relatively rotating faces. As a matter of fact, the fluid is usually discharged onto the seal 29 adjacent its left-hand (as shown in the drawing) side, inasmuch as the pumping vanes 57 would tend to carry the cooled fluid back out throug the bore 60 if the discharge were over the vanes 57. A branch inlet port 62a leads from the inlet hole 62 and discharges cooled lubricating liquid also into the right-hand (as shown in the drawing—FIG. 1) end of the seal cavity to better distribute the cooling fluid. This is conventional.

A heat exchanger 64 which may be of conventional form, is connected at its inlet end, by means of the conduit 65, to the tapped hole 61, and is connected at its outlet end to the tapped hole 63 by means of a discharge conduit 66. Thus, fluid may be pumped by the pumping vanes 57 on the rotary seal 19, through the bore 60, tapped hole 61, conduit 65, through the heat exchanger 64 and through the discharge conduit 66 into the tapped hole 63, inlet hole 62 and branch inlet port 62a, and discharged onto the seals 19 and 29 and into seal cavity 67 for cooling and lubricating the seals and cooling the seal cavity, the fluid having been cooled by the heat exchanger in its passage therethrough. This circuit of fluid through the heat exchanger is more or less conventional and would normally be operative whenever the pump was running.

The discharge conduit 66 has a vent valve 68 therein or connected thereto, preferably in close association with the outlet of the heat exchanger, the purpose of which vent valve will be described hereafter. Also, connected to the discharge conduit 66 is a branch conduit 69 in which is located a solenoid valve 70, and a second vent valve 71, and which branch conduit 69 discharges into the tapped hole 47. A by-pass conduit 72 is connected to the branch conduit 69 between the solenoid valve 70 and the discharge conduit 66, and is adapted when open to conduct fluid around the solenoid valve 70 and back into the branch conduit 69. A valve 73, preferably a manual valve, is in the by-pass conduit 72 and is operable to open and close said by-pass conduit 72 to the flow of fluid.

A valve 74, which may be a manual or an automatically controlled valve, may be placed in the discharge conduit 66 between the connection with the branch conduit 69 and the tapped hole 63. Usually it is preferable to omit the valve 74, which is used in the filling of the system and the bleeding of air therefrom, but in certain installations it is difficult to rid the system of all objectionable amounts of the entrapped air without use of the valve 74. Since the flow path from the seal cavity 67 through the inlet hole 62 and tapped hole 63 and through the discharge conduit 66 to the vent valve 68 is shorter than the flow path from the seal cavity 67 through the heat exchanger 64 to the vent valve 68, absence of the valve 74 would tend to cause the liquid being used to fill the pump and system to reach the valve 68 before the liquid from the seal cavity 67 through the heat exchanger 64 reaches the vent valve 68, and the simultaneous filling of the heat exchanger and its discharge line 66 etc. might result in the fluid being discharged through the valve 68 before all of the air is removed from the heat exchanger 64. Thus, an objectionable amount of air could remain trapped in the system. As a result, some means of blocking the discharge conduit 66 until after all of the system through the heat exchanger has been filled, is desirable. This will be described in detail later with respect to use of a valve 74 in the discharge line 66 during the fill operation. As mentioned, this valve may be entirely omitted, inasmuch as if it is left closed inadvertently when the pump is started, the seals will be destroyed very quickly.

The solenoid valve 70 is opened by relay 75 which is connected thereto through the electrical wires 76 and 77 and which relay, in turn, is connected to a starter switch 78 by means of the electrical connectors 79 and 80. It may be pointed out that as contemplated herein, the relay 75 is of the so-called "time-delay" type readily available on the market and it is not believed necessary to describe it in detail or its relation to the solenoid valve 70. Both the valve 70 and the time-delay relay 75 are commercial structures well known in the trade. The starter 78 is connected to the motor A by means of the electrical conduits 81 and 82. A source of current (not shown) to operate the motor and other mechanism is supplied to the starter in the well known manner, whereby actuation of the starter will energize the motor A.

The relay 75 is also connected to the starter as above mentioned, whereby actuation of the starter 78 to start the motor A at the same time actuates the relay 75 to open the solenoid valve 70, causing fluid to flow from the discharge conduit 66 through the branch conduit 69 and valve 70, into the tapped hole 47 above described. This will furnish fluid through the auxiliary injection system to the faces 55 and 56 of the seals. Since the relay 75 is a time-delay relay, after the valve 70 has been opened for the predetermined time; for example, 20 seconds, during the start-up period of the motor and pump, the relay will cause the valve 70 to close, thus stopping the flow of fluid through the auxiliary injection system to the faces 55 and 56 of the relatively rotating seals.

Referring to the pump impeller B, it is noted that there is schematically indicated the discharge line 83 leading from the pump outlet to the device into which the pump discharges, here shown schematically as a boiler 84. An inlet line 85 from a condensate pump 86 or other source of fluid under pressure (such, for example, as a pressure tank, water system or the like) leads into the pump inlet and supplies the system with fluid under some pressure. This is conventional and important, in that it supplies the fluid to fill the circuit prior to the pump being initially started or after it has been drained or partially drained for repair purposes, or otherwise.

It is noted that it is desirable, if not essential, to remove all of the air entrapped in the system before the pump is started. This is accomplished in a system from which the valve 74 has been omitted or left open, by first opening the vent valve 68 with the valve 73 closed, the valve 70 being closed and the valve 71 being also closed. Fluid from the pressure source such as the condensate pump 86, flows into the pump inlet and fills the pump chamber, stuffing box 12, the seal chamber 67, the bore 60, tapped hole 61, conduit 65 to the heat exchanger, and the heat exchanger. The fluid also fills the inlet hole 62, tapped hole 63 and heat exchanger discharge conduit 66. As the fluid fills these spaces, any air therein will be forced outwardly ahead of the fluid through the conduits 65 and 66, and out through the vent valve 68. When the fluid has reached the vent valve 68, indicating that all of the entrapped air in the portion of the circuit first vented has escaped, the valve 68 is manually closed. The operator then opens the valve 73 in the by-pass conduit 72 and the second vent valve 71 in the branch conduit 69, allowing the fluid to flow into the auxiliary injection system through the valve 73 and by-pass 72 to fill the conduit 69, tapped hole 47 and flexible tubing 51, and when this has occurred all objectionable air is out of the system and the valve 71 may be closed. The valve 73 is then closed, and the valves 68, 71 and 73 normally remain closed while the pump is operating.

After the system has been filled and valves 68, 71 and 73 closed, the operator may energize the starter 78 which starts the motor A and actuates the relay 75 to open the solenoid valve 70, whereby an initial charge of fluid is forced through the auxiliary injection system onto faces 55 and 56 of the seals, thus lubricating them. The time-delay on the relay 75 then closes the valve 70 and the regular lubricating and cooling system will take over the job of protecting the seal faces of the seals 19 and 29.

As pointed out above, it is preferable to include means to block the discharge conduit 66 during the operation or filling the system with fluid and removing air from the system. For this purpose, a valve 74, which may be manually operable, may be included in the discharge conduit 66. When this is done, the operator closes the valve 74 until the fluid has filled the heat exchanger circuit up to the valve 68. The operator then opens the valve 74, allowing the filling fluid to flow from the seal cavity 67 through the inlet hole 62, tapped hole 63, discharge conduit 66, and into the valve 68. This will indicate that all of the air is removed from the system in the normal pumping circuit, after which the valve 68 is closed and the auxiliary injecting circuits is then vented through the valve 71 as above described.

Figure 3:
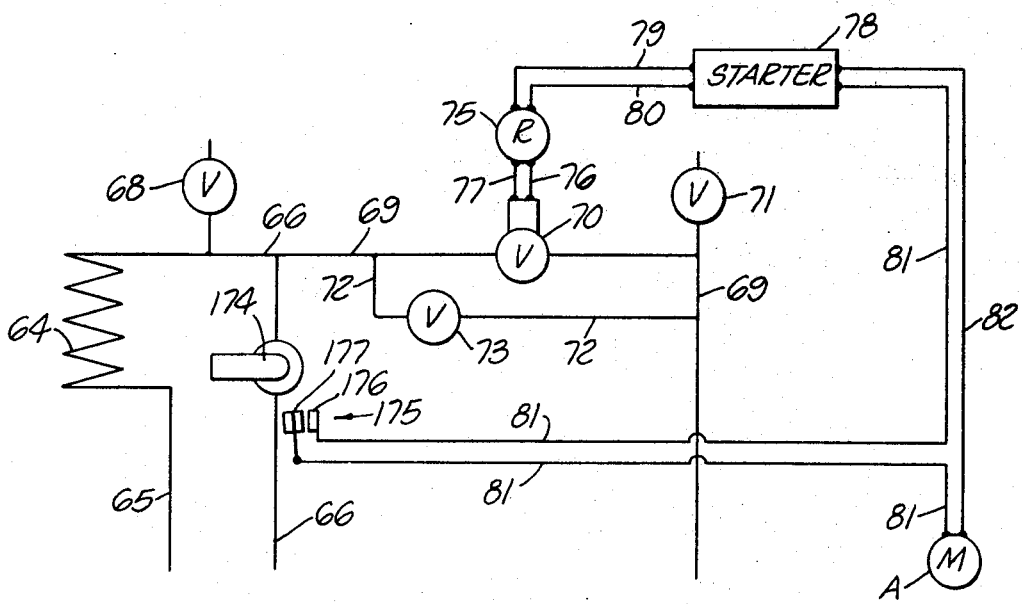
FIG. 3 is a fragmentary view of a modified arrangement of the schematically shown equipment of FIG. 1.

Referring to the modified arrangement shown in FIGS. 3 and 4, the system is similar to that described in connection with FIG. 1, except an automatic means has been provided to assure that the valve (74, in FIG. 1)—in the modified system designated as valve 174—is always properly open when the motor is started and in operation.

The valve 174 is provided with contacts to interrupt the motor circuit when the valve is closed so that the starter is not effective to start the motor until the valve is opened. As shown schematically in FIG. 3, electrical conduit 81 is provided with a circuit-interrupting switch 175 having the contacts 176 and 177 which are automatically opened when the valve 174 is closed and fluid cannot flow through the discharge conduit 66. Thus, in the arrangement of FIG. 3, no current can reach the motor when the switch 175 is open, and actuation of the starter will not operate the pump motor A.

Figure 4:
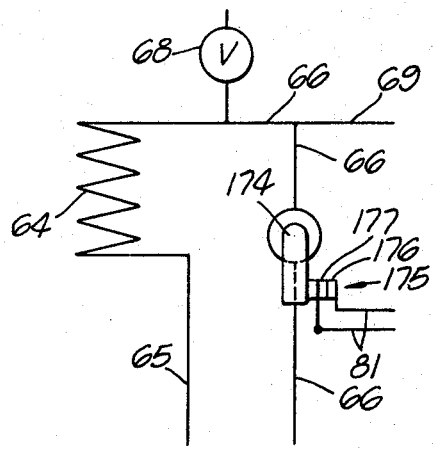
FIG. 4 is a fragmentary view of certain components illustrated in FIG. 3, showing some of the equipment in a different operating arrangement.

As shown in FIG. 4, the valve 174 is open to permit the flow of fluid in discharge conduit 66, and has closed the contacts 176 and 177 of the switch 175, completing the circuit path from the starter to the motor. Thus, actuation of the starter will allow current to flow through the electrical conduits 81 and 82 and cause the motor to rotate. This arrangement ensures against inadvertently starting the pump in operation without the lubricating and cooling system being operative, and thus preventing damage to, or destruction of one or both of the seals 19 and 29. The arrangement illustrated schematically in FIGS. 3 and 4 may be thus termed "an automatic safety control" for the pump lubricating system.

In connection with all of the auxiliary injection means illustrated herein, it is noted that should the operator desire to maintain lubrication onto the faces 55 and 56 of the seals when the pump is shut down or on stand-by and the motor is not operating, the by-pass valve 73 may be manually opened. in such event, the fluid under pressure used in charging the system, such as the fluid from the condensate pump, will leak across the faces 55 and 56 of the seals, thus assuring that they are ready for instant operation. Such leakage is comparatively minute, and will be conducted from the seal chamber through the space beneath the seals and bellows and out through the clearance, herein described as a port 87, between the nut 20 and the internal circumference of the bellows adapter 39. If desired, a special hole or port for this purpose may be provided. It is, of course, desirable that the by-pass valve 73 be closed during the actual operation of the pump.

OPERATION

In normal operation, when the pump has been installed for pumping fluid into a pressure vessel such as a boiler, a source of fluid under some pressure will be provided to the inlet of the pump impeller. This secondary source is frequently a condensate pump but, as mentioned above, may be a pressurized water main or other fluid source. The pressure furnished the pump impeller B is, of course, usually much less than the outlet pressure from the pump impeller B to the boiler, for example. Such pressure, which may be herein referred to as "secondary" pressure, will fill the pump cavity, leaking through the restricted passage between the sleeve 16 and the bore 11, into the stuffing box 12. The flow will then continue on through the restricted passage between the outer circumference (shoulder 58) of the rotatable sealing ring 19 and the inner circumference of the flange 37, into the seal cavity 67 and up through the bore 60. It is assumed that the manual valve 68 is open and the valve 74 is closed. The valve 73 also would be closed, and the solenoid valve 70 would be closed. Assuming this condition to exist, the fluid would continue up through the tapped hole 61 into the conduit 65 leading to the heat exchanger, would fill the heat exchanger and flow outward through the valve 68. With the valve 74 either absent from the conduit 66, or open (and normally at this time it would be opened), the filler fluid will flow from the seal cavity 67, through the inlet hole 62 and branch inlet port 62a, into the conduit 66 and out through the valve 68. This will eliminate all of the air from the normal seal lubricating system and the pump, as well as the heat exchanger and conduits.

The valve 68 will then be closed, and valves 71 and 73 will be opened, and fluid from the conduit 66 and possibly the conduit 65 through the heat exchanger 64, will continue to flow and fill the by-pass conduit 72 as well as the branch conduit 69, the tapped hole 47, the bore 48, the annular slot 49, the bore 50 and the flexible tubing 51, and be discharged onto the seal faces 55 and 56 through the axial bore 52, annular slot 53, longitudinal bores 54 and arcuate grooves 54a. When the system is thus filled with fluid, any entrapped air will have been eliminated and the valves 71 and 73 may then be closed. Should it be desired prior to starting the pump, that the fluid be allowed to flow across the faces of the seals, the valve 73 may be left open, but it should be closed by the time the motor is started.

With the system full of fluid from the secondary pressure as above described, the operator may energize the starter switch 78 which performs two functions. The switch will actuate the relay 75 which has a time-delay control, opening the valve 70 and allowing fluid to flow through the line 69 for the auxiliary injection system, and at the same time the starter energizes the motor A causing the shaft 13 to rotate. The relay 75 will remain operative to hold the valve 70 open for a predetermined time; for example, 20 seconds in many installations—while the motor A is increasing its speed to its normal operating speed. During the time the valve 70 is thus held open, fluid in the pump system under the influence of the secondary pressure as well as the increasing pressure caused by rotation of the impellers, will flow through the auxiliary injection system, through the conduit 69 and on to the seal faces as above described. The valve 70 will then be automatically closed due to interruption of the relay circuit, and the normal pump lubricating circuit through the heat exchanger and through the inlet hole 62 and branch inlet port 62a will then assume the lubricating and cooling functions for the pump seals.

While it is desirable that the conduit 66 have a valve whereby the heat exchanger and its conduits are vented first (the conduit 66 being shorter would tend to vent in a way that would leave air entrapped in the heat exchanger system if the valve 74 were not used), there is considerable danger that with a manual valve the operator would leave the valve closed when he has completed the venting operations. Applicant has, therefore, shown schematically means associated with the valve for interrupting the motor circuit when the valve 74 is closed, so that the motor cannot be started until the conduit 66 is open, and thereby the seal will be assured of proper lubrication and cooling after the pump has started. Thus, with the safety switch arrangement disclosed in FIGS. 3 and 4, the valve (here designated as valve 174) must be opened to allow starting and operating current to flow to the motor upon actuation of the starter 78. It is believed this arrangement will be clear from observation of FIGS. 3 and 4.

While the specific details of the invention have been herein shown and described, changes and alterations may be resorted to without departing from the spirit of the invention as defined in the appended claims.

I claim:

1. In combination with a pump adapted to contain fluid under pressure to be pumped and having a rotatable shaft, seal means to prevent leakage around said shaft, said seal means including a rotary sealing ring carried by said shaft, said sealing ring having a sealing face in relatively rotatable sealing relationship with another sealing face on a non-rotary sealing ring surrounding said shaft, a prime mover for said shaft, and means for actuating said prime mover, those improvements comprising:

(a) a fluid injection circuit extending from the fluid under pressure in said pump to said seal means, said fluid injection circuit passing through said non-rotary sealing ring and terminating in a discharge opening in the sealing face thereof, for injecting fluid into the space between said sealing faces intermediate their radially inner and radially outer boundaries to lubricate said faces;

(b) means operable by the operation of the means for actuating said prime mover to admit fluid from said fluid injection circuit into said space between said sealing faces; and (c) time-delay means automatically operable to close said fluid injection circuit whereby fluid from said pump through said fluid injection circuit will be discontinued after a predetermined time following the actuation of said prime mover.

2. In combination with a pump as claimed in claim 1, wherein said pump has a seal cooling system including a heat exchanger and means for circulating fluid out from said pump through said heat exchanger and back into said pump adjacent to said seal means, said fluid injection circuit extending from the fluid under pressure in said pump to said seal means through said seal cooling system.

3. In combination with a pump as claimed in claim 1, wherein said means operable by the operation of the means for actuating said prime mover to admit fluid from said fluid injection circuit into said space between said sealing faces comprises a solenoid valve in said fluid injection circuit, and said time-delay means automatically operable to close said fluid injection circuit comprises means for closing said solenoid valve.

4. In combination with a pump as defined in claim 3, a by-pass conduit means around said solenoid valve, and valve means in said by-pass conduit means for controlling the flow of fluid through said fluid injection circuit independently of said solenoid valve.

5. In combination with a pump as claimed in claim 4, a first vent valve in said seal cooling system at the outlet of said heat exchanger operative to vent air from said pump and said seal cooling system, and a second vent valve in said fluid injection circuit positioned and operative to vent air from the portion of said fluid injection circuit between said solenoid valve and said seal means.

6. In combination with a pump as claimed in claim 5, another valve in that portion of said seal cooling system through which fluid is circulated from said heat exchanger back into said pump, said another valve being located between said first vent valve and said pump, whereby when said another valve is closed any entrapped air in the heat exchanger may be vented.

7. In combination with a pump as claimed in claim 6, means for preventing the operation of said prime mover when said another valve is closed.

8. In a pump combination having a housing, a rotatable shaft extending through said housing; mechanical seal means including a rotatable seal ring and a non-rotatable seal ring with complementary opposed mating faces sealing fluid in said pump against escape from said housing between said housing and said shaft; electrical means for actuating said shaft rotating means; pumping means comprising an impeller having a fluid inlet and adapted when operating to supply fluid under pressure to said seal means; a heat exchanger; a fluid conduit from said pump to the inlet for said heat exchanger and a fluid conduit from the outlet of said heat exchanger to said pump to lubricate said seal and seal faces, and fluid pumping means in connection with said seal means driven by said shaft to pump fluid from said pump through said heat exchanger and back onto said seal means during normal operation of the pump; those improvements comprising:

(a) an auxiliary injection fluid circuit from said heat exchanger to said seals, including:
  (i) a branch conduit from the outlet of said heat exchanger to said pump;
  (ii) fluid connections from said branch conduit to the area between said seal faces;
  (iii) valve means in said branch conduit actuated by said means for actuating said shaft rotating means to open said branch conduit and cause the flow of fluid from said heat exchanger to said seal faces upon actuation of said shaft rotating means;

(iv) time-delay means to close said valve means after a predetermined time; and (b) means for supplying fluid under pressure to said pump whereby said auxiliary injection fluid circuit will lubricate said seal faces during the period of initial rotation of said shaft means and will discontinue such lubrication when said predetermined time-delay means effects the closing of said valve means.

References Cited

UNITED STATES PATENTS

| | | | |
|---|---|---|---|
| 2,631,050 | 3/1953 | Haeberlein | 277—12 |
| 2,824,759 | 2/1958 | Tracy | 277—15 |
| 2,834,619 | 5/1958 | McNab | 277—28 |

SAMUEL ROTHBERG, Primary Examiner

U.S. Cl. X.R.

103—111; 184—6; 277—15, 28

PO-1050
(5/69)

UNITED STATES PATENT OFFICE
CERTIFICATE OF CORRECTION

Patent No. 3,498,620      Dated March 3, 1970

Inventor(s) WINFRED J. WIESE

It is certified that error appears in the above-identified patent and that said Letters Patent are hereby corrected as shown below:

Column 1, line 30, after ""tion'" should be --,now abandoned in favor of continuation application Serial No. 791,859, filed January 2, 1969--, cancel "application"; line 35, after "Wilk," should be --Serial No. 699,577,--; lines 35-36, "concurrently herewith" should be --January 22, 1968--; line 37, "Both of the" should be --The--; line 47, after "faces" should be a comma (,).

Column 2, line 60, ",schematically, associated equipment of the pres-" should be --a portion of a pump housing illustrative of a--.

Column 3, line 9, cancel "impeller"; line 12, "the" should be --an--; lines 24-25, "re-retaining" should be --retaining--;

Column 4, line 10, "the" should be --a--; line 29, "seals" should be --sealing rings 19 and 29--; line 53, after "cooling" should be --and lubricating--; line 56, "fiilling" should be --filling--;

Column 5, line 12, after "ring" should be --29--; line 20, "ring" should be --rings 29 and 19--; line 44, after "29" should be a comma (,); line 56, "throug" should be --through--; line 58, after "lubricating" should be --and cooling--; line 60, after "cavity" should be --67--.

Column 6, line 5, after "exchanger" should be --64--; line 71, semicolon (;) should be a comma (,).

Column 7, line 1, cancel "impeller"; line 10, after "pump" should be --B--; line 14, after "pump" should be --B--; line 22, after "exchanger" should be --64--; line 23, after "exchanger" should be --64--; line 48, after "faces" should be --56 and 55--; line 52, "a" should be --the--; line 69, after "motor" should be --A--; line 72, after "starter" should be --78--.

Column 8, line 9, after "starter" should be --78--; after "motor" should be --A--; line 13, after "pump" should be --B--; line 22, after "seals" should be --29 and 19--; after "pump" should be --B--; line 23, after "motor" should be --A--; line 26, after "pump" should be --86--; line 27, after "seals" should be --29 and 19--; line 29, after "chamber" should be --67--; line 30, after "seals" should be --19 and 29--; after "bellows" should

PO-1050
(5/69)

UNITED STATES PATENT OFFICE
CERTIFICATE OF CORRECTION

Patent No. 3,498,620          Dated  March 3, 1970

Inventor(s)   WINFRED J. WIESE          PAGE - 2

It is certified that error appears in the above-identified patent and that said Letters Patent are hereby corrected as shown below:

be --38--; line 36, after "pump" should be --B--; line 39, after "pump" should be --B--; line 40, "a boiler" should be --the boiler 84--; line 42, "impeller" should be --B--; line 43, after "pump" should be --86--; line 47, cancel "impeller"; after "boiler" insert --84--; line 61, after "exchanger" (first occurrence) should be --64--; line 68, after "pump" should be --B--; line 69, after "exchanger" should be --64--.

Column 9, line 6, after "pump" should be --B--; line 7, after "faces" should be --55 and 56--; line 8, after "seals" should be --29 and 19--; line 9, after "motor" should be --A--; line 15, comma (,) should be a semicolon (;); line 16, after "A" should be a comma (,); line 26, after "faces" should be --55 and 56--; line 29, after "exchanger" should be --64--; line 31, "pump seals" should be --seals 19 and 29--; line 44, after "pump" should be --B--; line 48, after "motor" should be --A--.

SIGNED AND
SEALED
SEP 22 1970

(SEAL)
Attest:

Edward M. Fletcher, Jr.
Attesting Officer

WILLIAM E. SCHUYLER, JR.
Commissioner of Patents